(12) United States Patent
Inoue et al.

(10) Patent No.: US 7,510,204 B2
(45) Date of Patent: Mar. 31, 2009

(54) TOWING DEVICE FOR VEHICLE

(75) Inventors: Ryuuta Inoue, Shizuoka-ken (JP);
Masatoshi Takeshita, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 378 days.

(21) Appl. No.: 11/406,780

(22) Filed: Apr. 19, 2006

(65) Prior Publication Data
US 2006/0232043 A1 Oct. 19, 2006

(30) Foreign Application Priority Data
Apr. 19, 2005 (JP) ............................. 2005-120667

(51) Int. Cl.
*B60D 1/155* (2006.01)
(52) U.S. Cl. .................... 280/491.3; 280/494
(58) Field of Classification Search ................ 280/444, 280/491.3, 494, 506
See application file for complete search history.

(56) References Cited

U.S. PATENT DOCUMENTS

| | | | | | |
|---|---|---|---|---|---|
| 1,428,860 | A | * | 9/1922 | Reinschmidt | ............... 280/444 |
| 4,655,467 | A | * | 4/1987 | Kitzmiller et al. | ............ 280/444 |
| 4,856,805 | A | * | 8/1989 | Davis | ........................ 280/491.4 |
| 5,340,142 | A | * | 8/1994 | Kuhns | ......................... 280/444 |
| 5,516,140 | A | * | 5/1996 | Hinte | ........................ 280/494 |
| 5,788,255 | A | * | 8/1998 | Hayes et al. | ................ 280/410 |
| 5,857,692 | A | | 1/1999 | Hayes et al. | |
| 6,158,759 | A | * | 12/2000 | Perry | .......................... 280/444 |
| 6,193,260 | B1 | * | 2/2001 | Homan et al. | ................ 280/515 |
| 6,527,292 | B2 | * | 3/2003 | Adair | ....................... 280/491.3 |
| 6,729,637 | B2 | * | 5/2004 | Wolters et al. | ............ 280/491.3 |
| 6,997,472 | B2 | * | 2/2006 | Reutlinger et al. | ........ 280/491.3 |
| 7,052,032 | B1 | * | 5/2006 | Adair | ...................... 280/479.3 |

* cited by examiner

*Primary Examiner*—Tony H. Winner
(74) *Attorney, Agent, or Firm*—Knobbe, Martens, Olson & Bear, LLP

(57) ABSTRACT

A towing device capable of coupling a rear part of a front vehicle and a front part of a rear vehicle includes a support shaft, a coupled portion, and a tow bar. The support shaft is configured to be positioned on the rear part of the front vehicle such that an axis of the support shaft extends vertically. The tow bar can be pivoted from an extended position in which the distal end can be coupled to the coupled portion to a storage position in which the tow bar can be accommodated in the space below the rear part of the front vehicle.

28 Claims, 17 Drawing Sheets

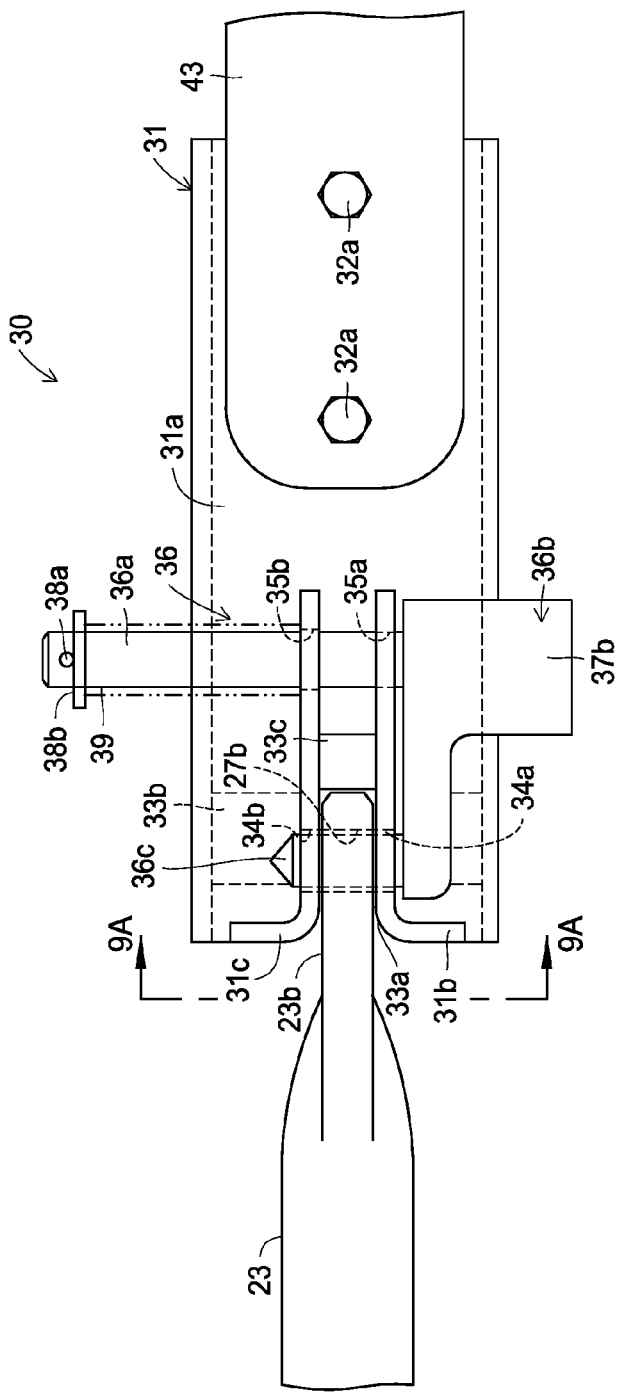
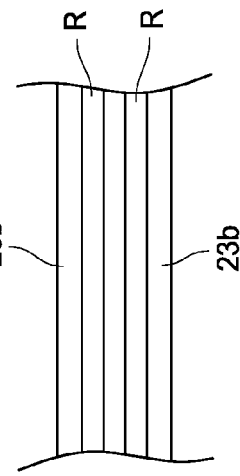
Figure 9
Figure 9a

TOWING DEVICE FOR VEHICLE

CROSS-REFERENCE TO RELATED APPLICATIONS

This application claims priority under 35 U.S.C. § 119(a) to Japanese Patent Application Serial No. 2005-120667, filed Apr. 19, 2005, the entire contents of which is hereby incorporated by reference.

BACKGROUND OF THE INVENTION

1. Field of the Invention

This application relates to a towing device that enables towing of one or more vehicles.

2. Description of the Related Art

A towing device is conventionally used to couple vehicles of the same type, such as golf carts, when they are moved to a storage place such as a garage. One known device includes a tow bar attached to a rear part of a golf cart that can pivot upward and downward and a coupling provided at a front part of a golf cart. A notch is formed in the distal end of the tow bar, at a part that faces upward when the tow bar is extended horizontally backward. The coupling includes a support member that is open at its top part and front part, and an engagement piece that extends between top rear parts of opposed walls of the support member.

When the tow bar and the coupling are connected, the tow bar is inserted from forward into the space defined by the support member of the coupling, and then the notch of the tow bar is brought into engagement with the engagement piece. At a rear part of the golf cart, there is provided a space to accommodate a golf bag, and above the space, there is provided a frame member for supporting the golf bag. When the tow bar is not used, the tow bar is rested against a rear part of the golf cart, with the notch being engaged with the frame member.

SUMMARY OF THE INVENTION

However, in such conventional towing device of the golf cart, the tow bar is positioned on the upper side of the vehicle body when the tow bar is not used. In this position, the tow bar can be a hindrance. Further, when the golf bag is placed at the rear part of the golf cart, the golf bag might rub against the tow bar, which might damage the surface of the golf bag.

Further, when the tow bar is used, the tow bar is coupled to the coupling while being securely held between the opposed walls of the support member and the engagement piece. The tow bar, therefore, cannot move vertically and laterally. Thus, when the ground surface on which the coupled vehicles run has a step of a large height or when the coupled vehicles make a sharp turn, excessive force might act on the tow bar so that at least one of the tow bar and the coupling could be damaged. Also, to couple the tow bar to the coupling, there is no other way but to insert the tow bar from forward into the support member. Therefore, a worker needs to move the front vehicle backward or move the rear vehicle forward to engage the tow bar with the coupling. It is thus necessary to carefully align the towing vehicle and the towed vehicle, and then move one of the vehicles such that the tow bar and coupling are brought into engagement. This can be a tedious and inefficient procedure for the worker.

In view of the foregoing problems, one aspect of the present invention provides one or more of the following objects: to provide a towing device for a vehicle that is not a hindrance when not being used, to make less tedious or more efficient the engagement of two vehicles, and to reduce or eliminate any excessive force from acting on a tow bar.

In order to achieve at least one of the foregoing objects, one aspect of the present invention is directed to a towing device for a vehicle capable of coupling a rear part of a front vehicle and a front part of a rear vehicle. The towing device has a support shaft provided at lateral center in the rear part of the front vehicle. Stated another way, the support shaft is intersected by a longitudinally extending vertical center plane that coincides with the mid-plane of the vehicle. The support shaft has an axis that can extend vertically. A coupling is provided at the front part of the rear vehicle. The towing device also has a tow bar that has a distal end and a proximal end, the distal end being capable of being removably coupled to the coupling. The proximal end is capable of being attached to the support shaft to be pivotable about the axis of the support shaft. When the tow bar is not used, the tow bar can be pivoted from an extended position toward a vehicle body to be accommodated in the space below the rear part of the front vehicle.

In one aspect of the invention, when a vehicle is not being towed, the tow bar can be accommodated in the space below the rear part of the vehicle, so that the tow bar is generally out of the way and thus not a hindrance. For example, the tow bar can be accommodated in an accommodating section defined by a recess or the like. In another example, the tow bar can be positioned in the space below the vehicle where the tow bar is generally out of the way and thus not a hindrance. In an arrangement where a front vehicle (e.g., one that pulls another vehicle) has a bumper or a rear cowl, the tow bar can be accommodated in a space below the bumper or the rear cowl. In this case, the tow bar generally is not a hindrance when not being used. Also, because the tow bar is out of sight and generally not visible, the appearance of the vehicle improves.

In one aspect, the present invention is directed to a towing device for a vehicle, in which the coupled portion or coupling can be coupled to a steering link of the rear vehicle so that the rear vehicle can be steered in response to pivotal movement of the tow bar. According to this aspect of the invention, as the tow bar is displaced to the left or right in response to the running direction of the front vehicle, the rear vehicle is steered in response to the displacement of the tow bar. This arrangement enables at least two vehicles to be moved simultaneously properly.

In another aspect, the present invention is directed to a towing device for a vehicle in which a proximal end of a tow bar is attached to a support shaft, such that a distal end of the tow bar can swing and/or translate upward and downward. According to this arrangement, the tow bar can swing, translate, or otherwise move upward and downward when there is a difference in height between a ground surface on which the front vehicle is running and a ground surface on which the rear vehicle is running. Thus, the forces that act on the tow bar can be reduced. Reducing the forces that act on the two bar can prevent the tow bar and other components of the towing device from being damaged. To permit the tow bar to swing, translate, or otherwise move upward and downward, there may be provided a play (e.g., clearance) between the proximal end of the tow bar and the support shaft. In another arrangement, the tow bar may be attached to the support shaft via an elastic member such as a spring member.

In another aspect, a towing device for a vehicle includes a coupled portion. The coupled portion can be associated with a rear vehicle an can be provided with a recess forming portion that has a recess that opens upwardly and forwardly. A distal end of a tow bar can be inserted into the recess forming portion. In another arrangement, a recess forming portion that has a recess that opens downwardly and backwardly is provided on a part of the distal end of the tow bar that faces downwardly when the tow bar is coupled to the coupled portion. The coupled portion can be provided with an insertion portion to be inserted in the recess of the recess forming portion on the tow bar. The distal end of the tow bar can be lowered from above relative to the coupled portion to enable the tow bar and the coupled portion to be coupled to each other.

In one technique for using the towing device, the tow bar of the front vehicle and the coupled portion of the rear vehicle are coupled to each other. For example, the tow bar can be lowered from above, as well as being inserted from forward relative to the coupled portion. Thus, the vehicles need not be moved for them to be coupled together, thereby improving workability.

In one aspect, the present invention is directed to a towing device for a vehicle in which a recess forming portion is provided that includes a base member in the shape of a flat surface. The towing device also includes a pair of L-shaped plate members that can be formed by bending a plate member into the shape of an L to includes a longitudinal portion and a lateral portion. The paired L-shaped plate members can be fixed on one face of the base member, with the longitudinal portions being opposed with a certain distance therebetween. The lateral portions extend outside from the front ends of the longitudinal portions to be spaced away from each other. The space enclosed by the base member and the longitudinal portions of the paired L-shaped plate members at least partly defines the recess. According to this aspect of the invention, when the tow bar is inserted from a forward position relative to the coupled portion to couple the tow bar and the coupled portion, the lateral portions of the L-shaped plate members defining the recess serve as guides. Thus, coupling the tow bar and the coupled portion together is facilitated. Further, when the L-shaped plate members are used, the plate members can be more securely fixed to the base member.

In another aspect, the present invention is directed to a towing device for a vehicle in which a stopper is provided between the longitudinal portions of the paired L-shaped plate members to fix or at least partially define the position of the distal end of the tow bar relative to the coupled portion and to reinforce the paired L-shaped plate members. According to this aspect, the paired L-shaped plate members can be securely fixed, and coupling of the tow bar and the coupled portion can be accomplished properly. Further, alignment of the distal end of the tow bar and the coupled portion is facilitated.

In another aspect, the present invention is directed to a towing device for a vehicle in which a distal end of a tow bar and a coupled portion are coupled to each other via a coupling mechanism. The coupling mechanism can include a coupling shaft or a coupling hole provided at the distal end of the tow bar perpendicularly to the longitudinal direction of the tow bar and horizontally. The coupling mechanism also can include a coupled hole provided in the coupled portion to engage with the coupling shaft for pivotal movement of the tow bar. The coupling mechanism also can include a coupled shaft provided on the coupled portion to engage with the coupling hole for pivotal movement of the tow bar.

According to this aspect, since the tow bar can swing upward and downward relative to the coupled portion, the force that acts on the tow bar can be can be minimized or reduce, even when there is a difference in height between a ground surface on which the front vehicle is running and a ground surface on which the rear vehicle is running. By providing another mechanism to connect the proximal end of the tow bar to the rear part of the front vehicle for up-and-down swinging, or translational, or pivotal movement, the plural vehicles coupled to each other can run more properly on the two ground surfaces having a difference in height.

In one aspect of the present invention, a towing device for a vehicle is provided in which a coupling shaft and a coupled hole are formed to engage with each other. In one arrangement, the coupling shaft and the coupled hole engage coaxially. The coupling shaft and coupled hole can be urged by means of a spring member into engagement with each other.

In one construction, once the tow bar and the coupled portion are coupled to each other, the tow bar and coupled portion remain in the coupled state. This arrangement can eliminate a separate step of fastening components or members, such as a pin and a lever, to maintain the coupled state, e.g., between the coupling shaft and the coupled hole or between the coupling hole and the coupled shaft. In one arrangement, when the tow bar and the coupled portion are coupled to each other, one of those members is pulled in the direction of disengagement against urging force of the spring member. The member is then released with both members aligned in a position of engagement, so that both members are engaged with each other. Thus, the procedure for coupling is facilitated.

In one aspect, the present invention is directed to a towing device for a vehicle. The towing device includes a tow bar that comprises a tubular member. At least one of the proximal end and the distal end of the tow bar can be formed, e.g., pressed, into another shape, e.g., including a flat surface.

In one arrangement, a proximal end of the tow bar can be coupled to the rear part of the front vehicle or a distal end of the tow bar can be coupled to the coupled portion of the rear vehicle. One of the proximal and distal ends of the tow bar can comprise a flat surface. A hole or the shaft used for coupling can be formed at or adjacent the flat surface. In some arrangements discussed further below, a central portion of the tow bar can be in a tubular shape or other shape that can be easily gripped. This arrangement improves the operability of the tow bar and towing device. In one aspect, the towing bar is configured to have increased strength, e.g., by having a round cross-section at a central portion. In various arrangements, the distal end or the proximal end (or both ends) of the tow bar comprises a flat surface and the end thereof comprises an arcuate shape. Including an arcuate shape reduces the tendency of the corners of the end of the tow bar to hinder pivotal movement of the tow bar. The tow bar thus can be configured to pivot smoothly.

In one aspect, the present invention is directed to a towing device for a vehicle in which at least one of the proximal end and the distal end of the tow bar is reinforced, e.g., having a reinforcement inner tube inserted in an inner space of the tow bar. Where provided, the inner tube can be configured with, e.g., pressed into the shape of, a flat surface together with the end of the tow bar. In this arrangement, the mechanical strength of the proximal end or the distal end (or both) of the tow bar can be increased. By increasing the strength of the tow bar, the likelihood of damage to the tow bar can be reduced.

In another aspect, the present invention is directed to a towing device for a vehicle, in which a front vehicle and a rear vehicle are vehicles of the same type, and two or more of the vehicles of the same type can be coupled to each other via the towing device. The vehicles of the same type can be, for example, vehicles that are used in the same place, and stored in a certain storage place such as a garage when not being used. Golf carts used at a golf course are one example of such vehicles. Go-carts used at an amusement part are another example of such vehicles.

In another aspect, a towing device capable of coupling a rear part of a front vehicle and a front part of a rear vehicle is provided. The towing device includes a support shaft, a coupled portion, and a tow bar. The support shaft is configured to be positioned on the rear part of the front vehicle such that an axis of the support shaft extends vertically. The coupled portion is configured to be positioned on the front part of the rear vehicle. The tow bar has a distal end and a proximal end. The distal end is capable of being removably coupled to the coupled portion and the proximal end is coupled with the support shaft to be pivotable about the axis of the support shaft. The tow bar can be pivoted from an extended position in which the distal end can be coupled to the coupled portion to a storage position in which the tow bar can be accommodated in the space below the rear part of the front vehicle.

In another aspect, a system for towing a rear vehicle behind a front vehicle is provided. The system includes a front vehicle and a towing device. The front vehicle has a rear part and a vehicle body. The towing device is coupled with the front vehicle and is configured to be removably coupled with a front part of a rear vehicle. The towing device includes a support shaft and a tow bar. The support shaft is positioned on the rear part of the front vehicle and is rotatable about a vertically extending axis. The tow bar has a proximal end and a distal end and is configured to be removably coupled with the rear vehicle. The proximal end is coupled with the support shaft to be pivotable about the axis of the support shaft. The towing device has a storage configuration in which at least the distal end of the tow bar is accommodated at a location laterally spaced from the support shaft.

In another aspect, a towing device for a vehicle capable of coupling a rear part of a front vehicle and a front part of a rear vehicle is provided. The towing device includes a support shaft, a coupled portion, and a tow bar. The support shaft is provided in the rear part of the front vehicle near a longitudinally extending vertical center plane thereof. An axis of the support shaft extends vertically. The coupled portion is provided at the front part of the rear vehicle. The tow bar has a distal end and a proximal end, the distal end being capable of being removably coupled to the coupled portion. The proximal end is attached to the support shaft to be pivotable about the axis of the support shaft. When not in use, the tow bar can be pivoted toward and positioned in the space below the rear part of the front vehicle.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

FIG. 9 is a plan view, showing one state in which a tow bar and a coupled portion are coupled to each other.

FIG. 9A is a partial cross-sectional view of a distal end of a tow bar with a reinforcement member inserted therein.

DETAILED DESCRIPTION OF THE PREFERRED EMBODIMENT

Figure 1:
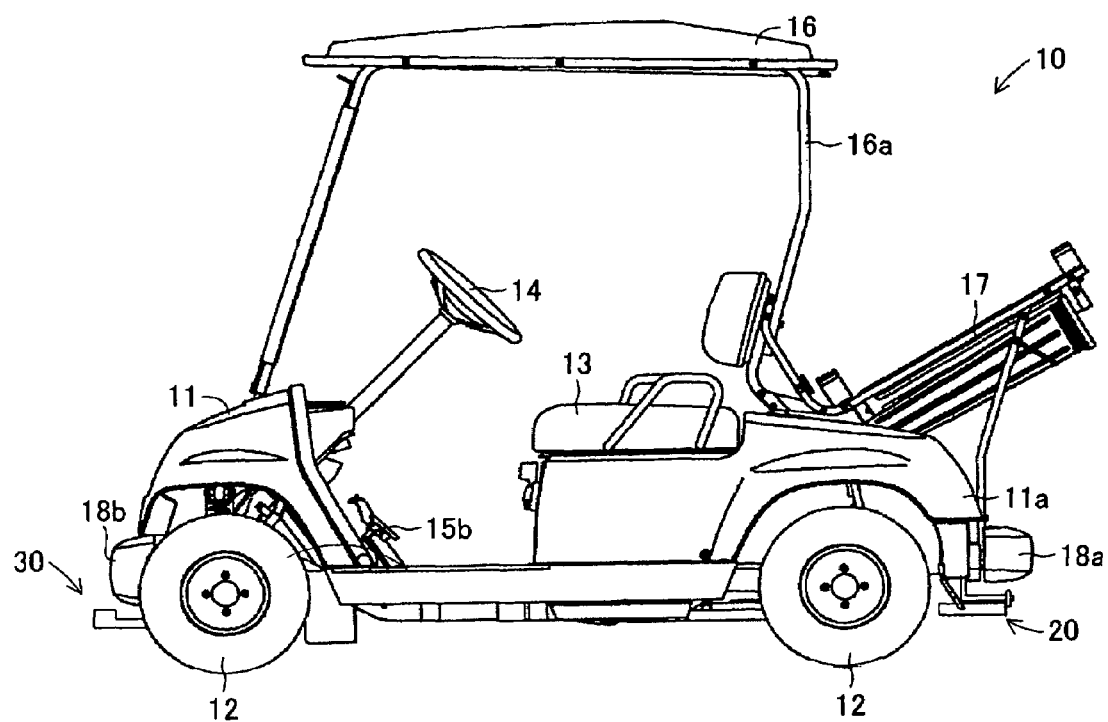
FIG. 1 is a side view of a golf cart with a towing device according to one embodiment.
Figure 2:
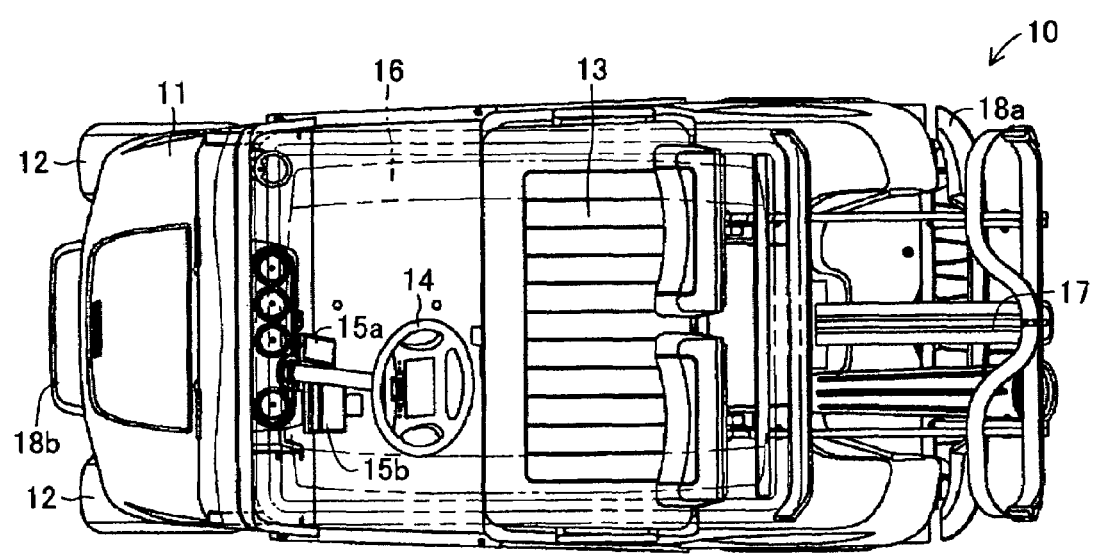
FIG. 2 is a plan view of the embodiment of the golf cart shown in FIG. 1.
Figure 3:
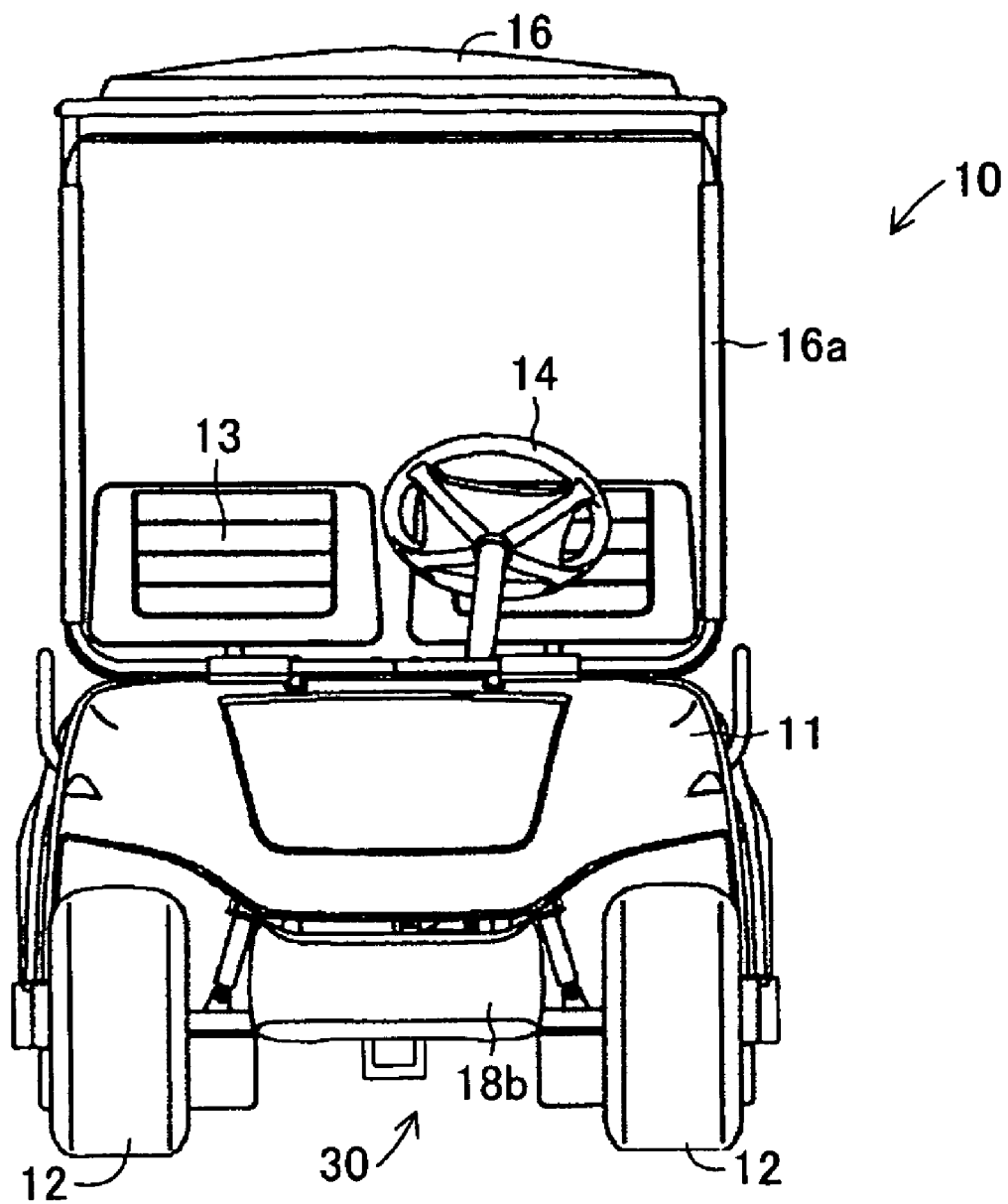
FIG. 3 is a front view of the embodiment of the golf cart shown in FIG. 1.
Figure 4:
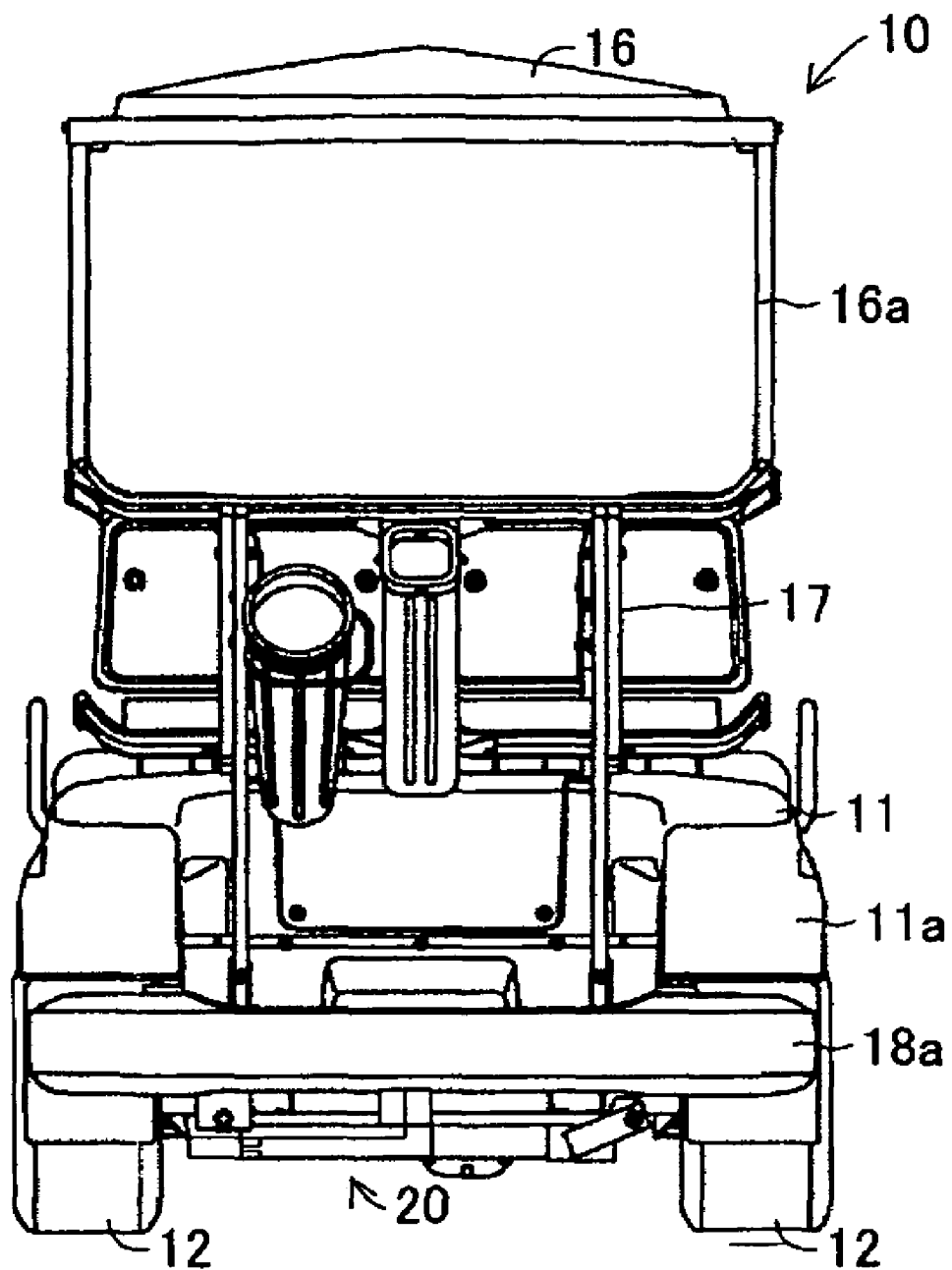
FIG. 4 is a rear view of the embodiment of the golf cart shown in FIG. 1.

A detailed description will be hereinafter made of various embodiments of a towing device for a vehicle with reference to the drawings. FIGS. 1-4 show a golf cart 10 as a vehicle that can employ a towing device of the embodiments disclosed herein. The golf cart 10 has four wheels 12, which are left and right front wheels and left and right rear wheels, under a vehicle body 11, and a seat 13 for two people in a central portion of the vehicle body 11. In other arrangements, other numbers of wheels or a different seating capacity can be provided. A steering wheel 14 is provided in front of the seat 13. Below the steering wheel 14, there are provided an acceleration pedal 15a and a brake pedal 15b, which can be located side by side. A roof 16 is provided on top of the vehicle body 11 via a support frame 16a.

The vehicle body 11 includes a cowl 11a that defines a rear part of the vehicle body 11. A bag holding member 17 on which a user can place a golf bag (not shown) can be attached on top of the cowl 11a. A bumper 18a can be attached to the lower rear end of the cowl 11a, and a bumper 18b can be attached to the lower front end of the vehicle body 11. As a driver in the seat 13 turns the steering wheel 14 to the left or right, the front wheels 12 turn to the left or right, so that the golf cart 10 changes the running direction while turning to the left or right. As the driver depresses the acceleration pedal 15a, the golf cart 10 accelerates in response to the displacement of the acceleration pedal 15a.

Generally, the acceleration of the golf cart 10 increases for larger displacement of the acceleration pedal 15a and increases at a slower rate or decreases for smaller displacement of the acceleration pedal 15a. While the displacement of the acceleration pedal 15a is held constant, the golf cart 10 runs at a constant speed, other conditions remaining the same. As the driver displaces, e.g., depresses, the brake pedal 15b, the wheels 12 are applied with braking in response to the displacement. Generally, braking force applied to the wheels 12 is proportional to movement of (e.g., displacement of) the brake pedal 15b.

In one arrangement, a coupling portion 20, sometimes referred to herein as a "coupling", is provided on the vehicle body 11 and below the bumper 18a, and a coupled portion 30 is provided on the vehicle body 11 and below the bumper 18b. In one embodiment a towing device is provided that comprises the coupling portion 20 and the coupled portion 30.

Figure 5:
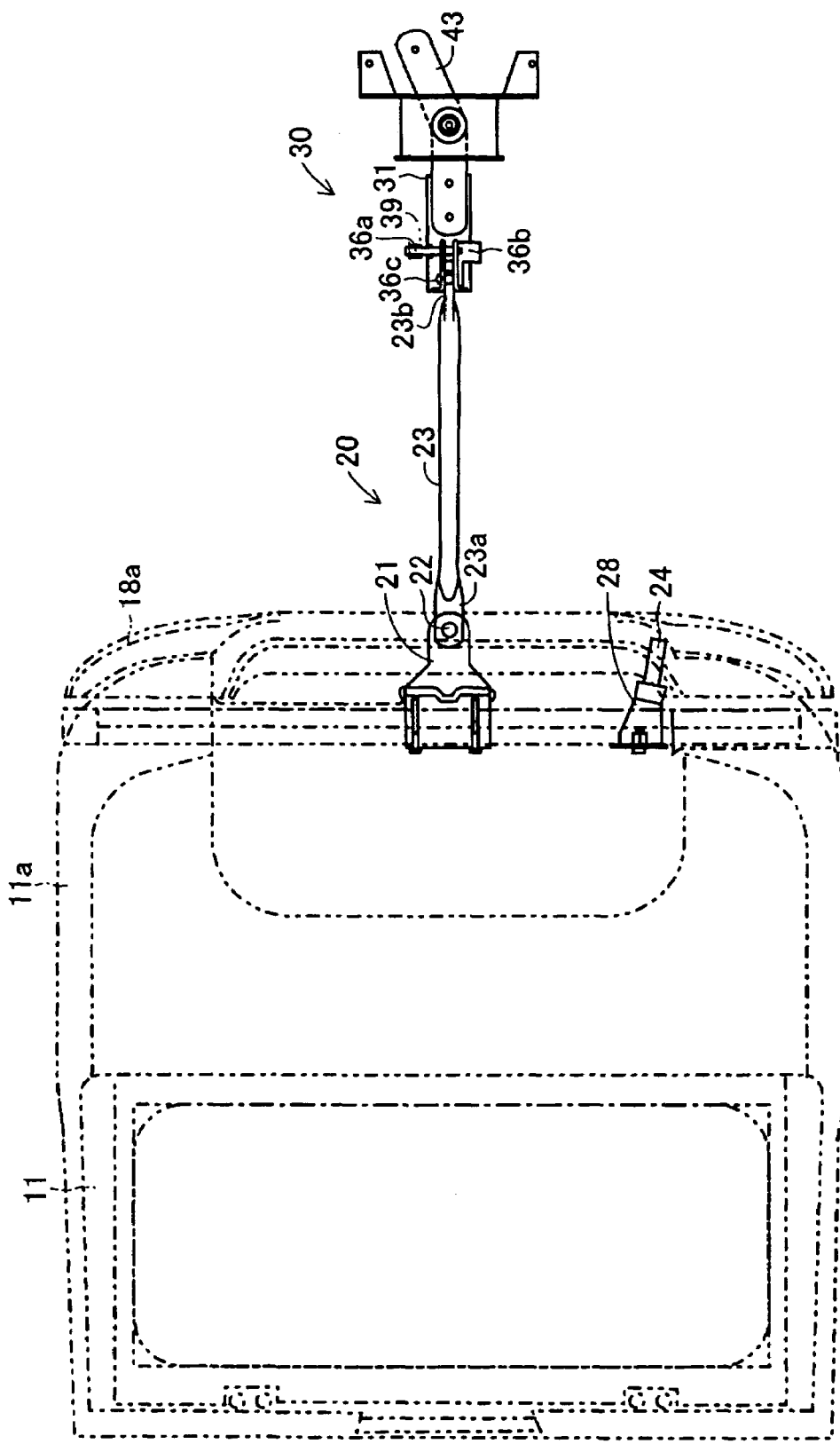
FIG. 5 is a plan view of one embodiment of a towing device illustrating a coupling portion or coupling.
Figure 6:
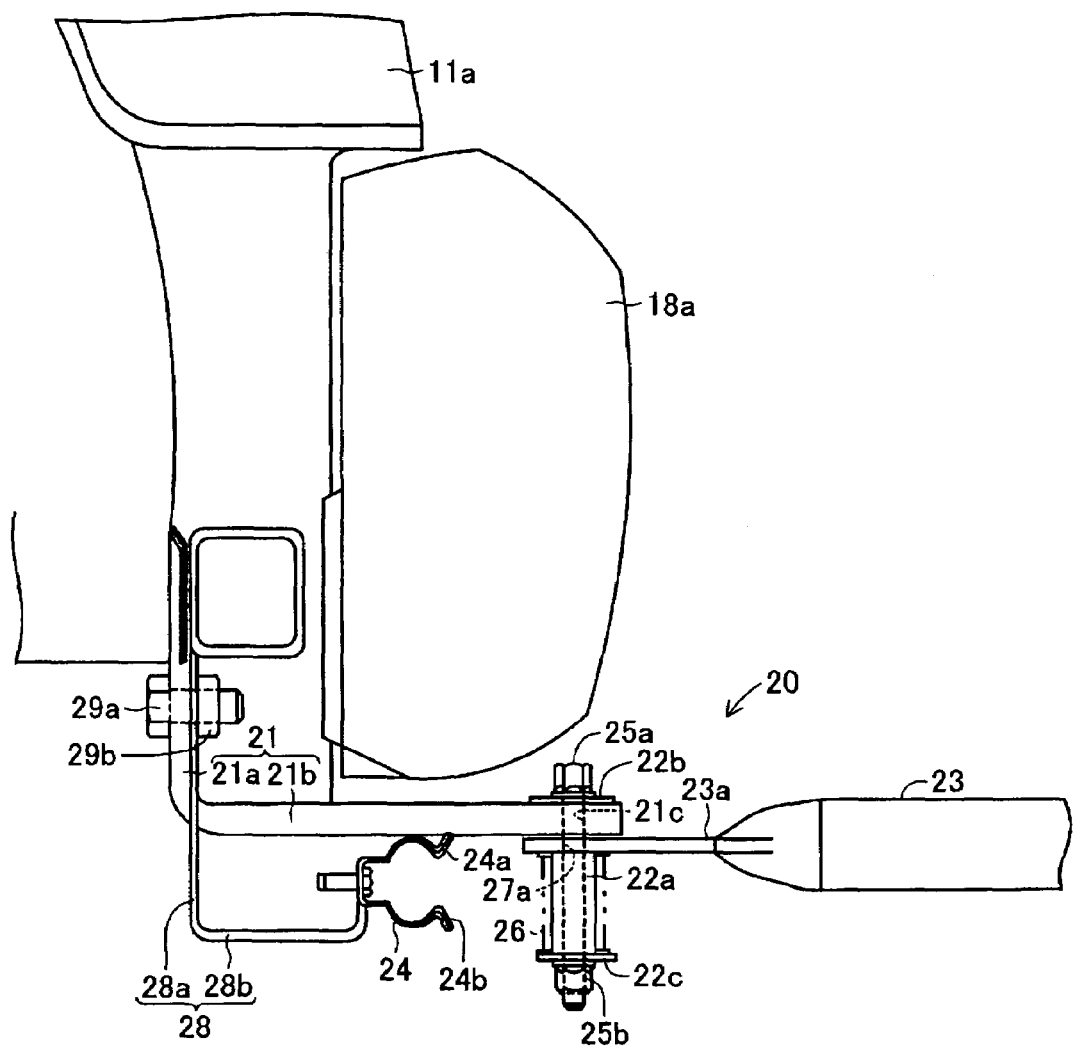
FIG. 6 is a side view of the embodiment of towing device illustrated in FIG. 5.

As shown in FIGS. 5 and 6, the coupling portion 20 includes a support member 21, a support shaft portion 22, a tow bar 23, and a grip member 24. The support member 21 can be in an L shape comprising a fixing portion 21a and a support portion 21b. The fixing portion 21a can be fixed to or coupled with the lower rear end of the cowl 11a, e.g., generally centrally thereof in the lateral direction of the vehicle, and can extend downward. The support portion 21b can extend rearward, e.g., from the lower end of the fixing portion 21a beneath the lower side of the bumper 18a. The distal end (rear end) of the support portion 21b can include a hole 21c that extends vertically therethrough.

In one embodiment, the support shaft portion 22 is attached to the rear end of the support portion 21b via the hole 21c. More specifically, the support shaft portion 22 can include a tubular collar 22a that is inserted through the hole 21c, and washers 22b, 22c disposed on both ends of the collar 22a. A bolt 25a is inserted through the inner space of the collar 22a and the washers 22b, 22c, and a nut 25b is attached to the distal end of the bolt 25a. The support shaft portion 22 is thereby attached to the support member 21.

A coil spring 26 or other resilient member can be disposed on the outer peripheral face of the collar 22a and between the lower face of the support portion 21b and the upper face of the washer 22c. The coil spring 26 can be in a compressed state between the lower face of the support portion 21b and the upper face of the washer 22c so that the coil spring 26 urges the washer 22c away from the support portion 21b. In other words, the bolt 25a and the nut 25b are attached, with the coil spring 26 in the compressed state. The washers 22b, 22c are in pressing contact with the respective ends of the collar 22a against elastic force of the coil spring 26.

The tow bar 23 can comprise a metal pipe, and the proximal end 23a and the distal end 23b of the tow bar 23 can be shaped, e.g., pressed, into the shape of a flat surface. The flat surface of the proximal end 23a and the flat surface of the distal end 23b can be formed to be perpendicular to each other. As the tow bar 23 is horizontally disposed and the flat surface of the proximal end 23a is directed horizontally, the flat surface of the distal end 23b faces perpendicularly to an axis of the tow bar 23. Stated another way, an axis perpendicular to the flat surface of the proximal end 23a is perpendicular to the axis of the tow bar 23 in one embodiment. In the inner space of the proximal end 23a and the distal end 23b of the tow bar 23, and in the vicinity thereof, reinforcement inner tubes or member R can be inserted. The proximal end 23a and the distal end 23b can be pressed with the respective inner tubes, into the shape of a flat surface. See FIG. 9A. Providing such reinforcement is one technique for increasing the mechanical strength of the proximal end 23a and the distal end 23b.

In one embodiment, the end of the proximal end 23a and the end of the distal end 23b are in a semicircular shape. A central portion of the semicircular end of the proximal end 23a can be formed with an engagement hole 27a, and a central portion of the semicircular end of the distal end 23b can be formed with a coupling hole 27b. The tow bar 23 can be supported with the support member 21 via the support shaft portion 22, such that the collar 22a is inserted through the engagement hole 27a and the proximal end 23a of the tow bar 23 is disposed between the support portion 21b and the coil spring 26. The tow bar 23 is pivotable on a horizontal plane about the collar 22a. The tow bar 23 is also swingable upward and downward about the collar 22a, while intermittently compressing the coil spring 26. As the tow bar 23 swings, the proximal end 23a thereof may translate to some degree.

In one embodiment, to the lower rear end of the cowl 11a and on the left side of the vehicle body 11, a fixing member 28 is provided, e.g., formed or fixed, via the support member 21. The grip member 24 can be fixed at the rear end of the fixing member 28. The fixing member 28 can comprise an L shape and can include a fixing portion 28a and a horizontal portion 28b. The fixing portion 28a is fixed to the cowl 11a and extends downward. The horizontal portion 28b extends backward from the lower end of the fixing portion 28a. The fixing member 28 can be fixed to the support member 21 via a suitable fastener, such as a bolt 29a and a nut 29b. The fixing member 28 supports the grip member 24, such that the vertical position of the grip member 24 is generally the same as the vertical position of the support shaft portion 22.

The grip member 24 is configured to grip and immobilize a portion of the tow bar 23 on the distal-end side thereof, when the tow bar 23 is accommodated in the space below the vehicle body 11. The grip member 24 comprises a generally circular elastic piece that is open at the rear end. The grip member 24 preferably can spread vertically. In one embodiment, the rear end of the grip member 24 has opposed, flared parts 24a, 24b with a distance therebetween increasing toward the rear side. As the tow bar 23 is pushed against the flared parts 24a, 24b, the flared parts 24a, 24b spread outwardly to allow insertion of the tow bar 23 into the space defined by the grip member 24. When the tow bar 23 has been received in the space defined by the grip member 24, the flared parts 24a, 24b return to their original state to immobilize the tow bar 23.

Figure 7:
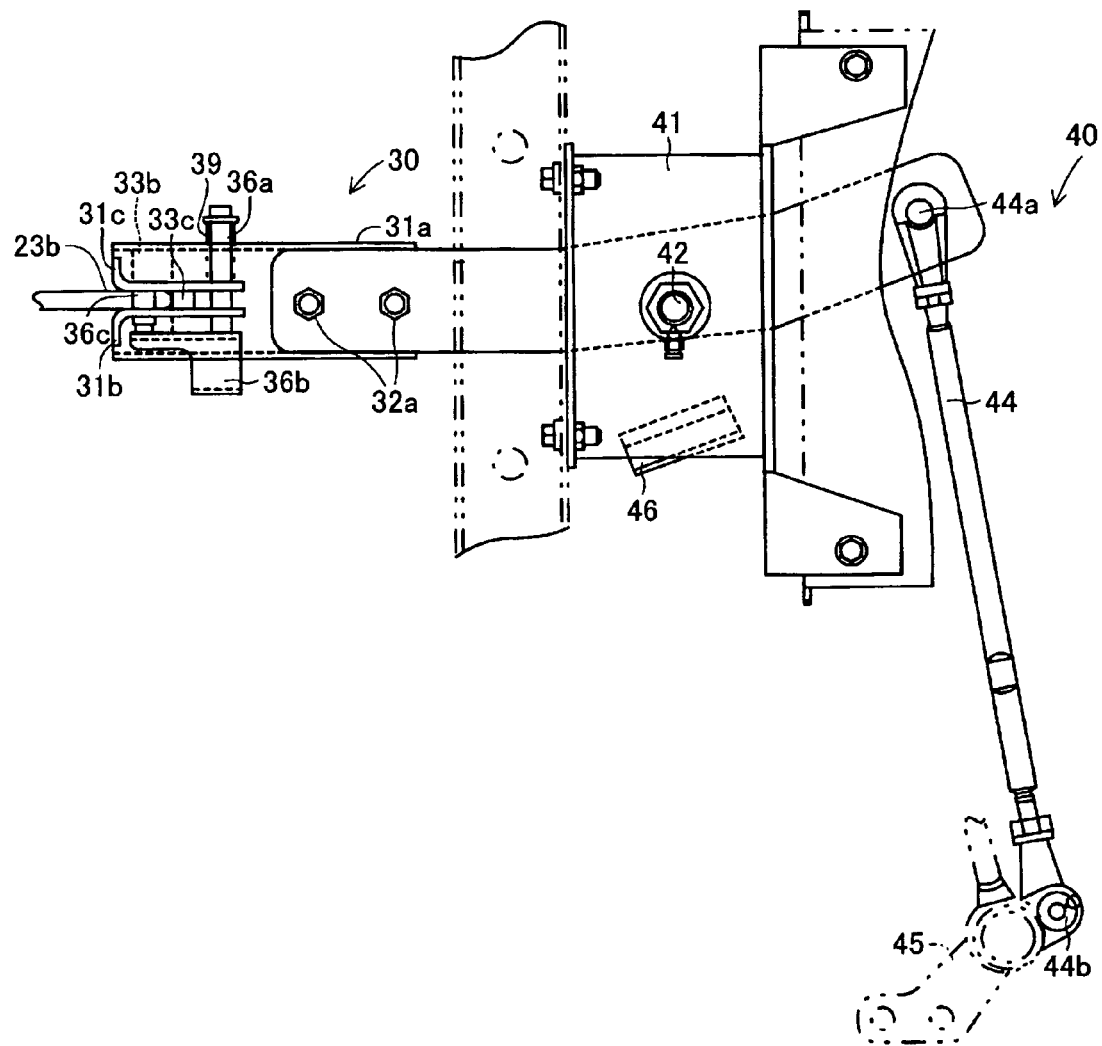
FIG. 7 is a plan view of a steering link and a coupled portion of one embodiment of a towing device.
Figure 8:
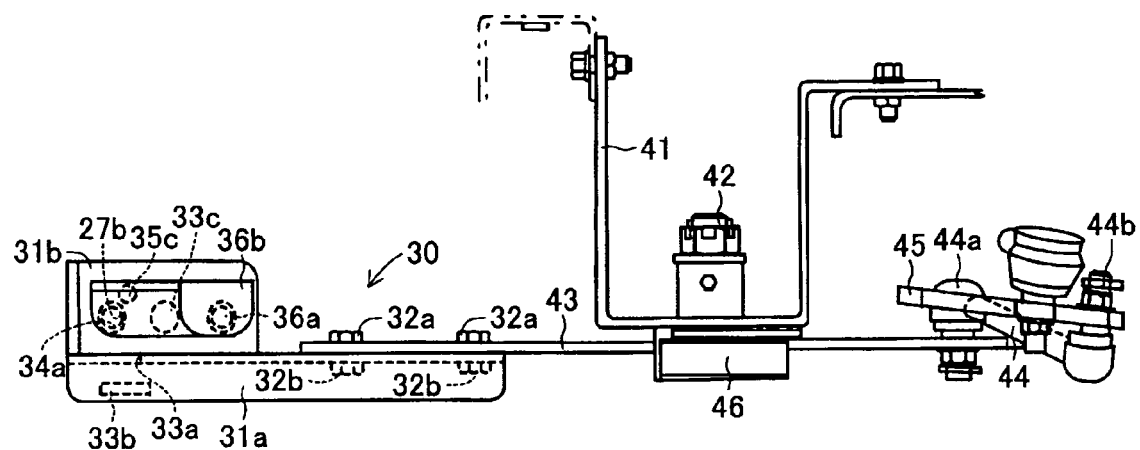
FIG. 8 is a side view of the embodiment of the coupled portion of FIG. 7.

As shown in FIGS. 7 and 8, the coupled portion 30 can be provided via a steering link 40 that is provided on the front side of the vehicle body 11. More specifically, there is provided a plate-like lever 43 that can be attached to a frame 41 of the vehicle body 11 via a pivot support shaft 42 to be horizontally pivotable. The coupled portion 30 is attached to the front end of the plate-like lever 43. In one embodiment, the lever 43 includes a longer front portion and a shorter rear portion with respect to the pivot support shaft 42. The lever 43 is in a curved shape such that as the front portion is directed straight forward, the rear portion is inclined to the right of the vehicle body 11.

The rear end of the lever 43 is coupled to one end of a tie rod 44 that is pivotable about a support shaft 44a. The other end of the tie rod 44 is coupled to a pivotable knuckle arm 45 via a support shaft 44b. The knuckle arm 45 is coupled to the left front wheel 12. As the front portion of the lever 43 is displaced to the left or right, the displacement force of the lever is transmitted to the left front wheel 12 via the tie rod 44 and the knuckle arm 45, so that the left front wheel 12 turns to the left or right.

The left front wheel 12 and the right front wheel 12 are operatively connected with each other to change their direction. As the left front wheel 12 turns to the left or right, the right front wheel 12 also turns to the left or right in response to the turning movement of the left front wheel 12. There is provided a stopper 46 on the underside of the frame 41. The stopper 46 is designed such that as the lever 43 pivots to the left of the vehicle body 11 by a predetermined angle, the stopper 46 abuts against the front portion of the lever 43 to prevent further pivotal movement thereof to the left, while as the lever 43 pivots to the right of the vehicle body 11 by a predetermined angle, the stopper abuts against the rear portion of the lever 43 to prevent further pivotal movement thereof to the right.

Figure 10:
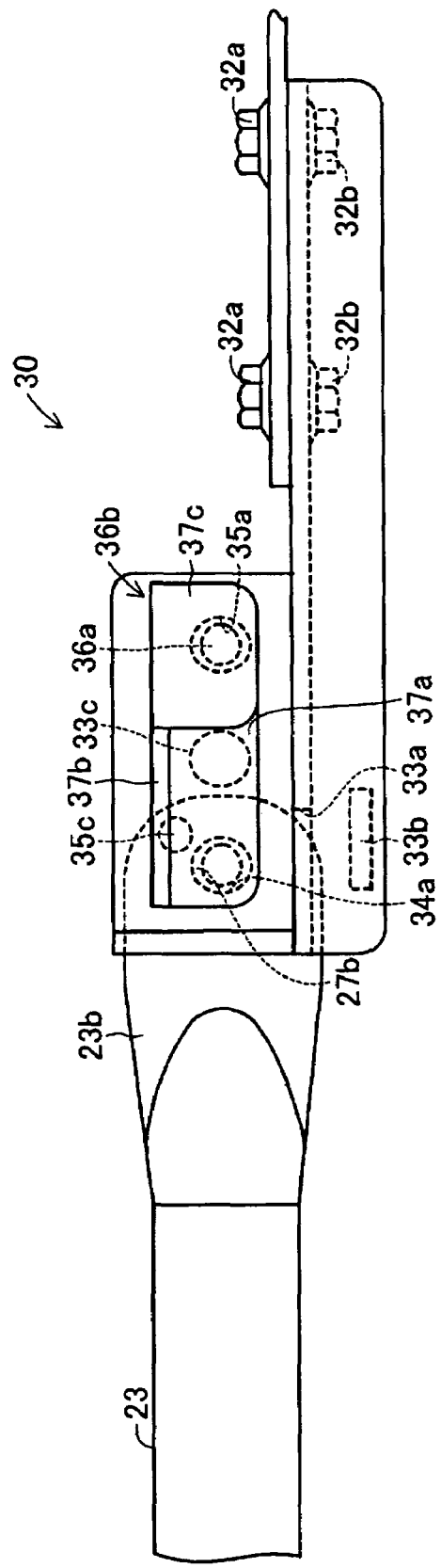
FIG. 10 is a side view further illustrating the coupled state illustrated in FIG. 9.

The coupled portion 30, provided at the front end of the lever 43, can be coupled to the distal end 23b of the tow bar 23, and can be arranged as shown in FIGS. 9 and 10. More specifically, in one embodiment the coupled portion 30 has a recess forming portion 31 that includes a base member 31a and a pair of L-shaped plate members 31b, 31c. A rear portion of the recess forming portion 31 is secured to the front end of the lever 43 by a suitable fastener, such as two bolts 32a and two nuts 32b. The base member 31a can be formed as a plate member including a rectangular portion, and sidewalls of a low height extending downward from longitudinal opposite edges of the rectangular portion. The base member 31a can have a cross section in the shape of an arch.

A notch 33a having a width slightly larger than the width of the distal end 23b of the tow bar 23 can be formed centrally, e.g., laterally centrally, in the front end of the base member 31a. Between the sidewalls of the base member 31a and below the notch 33a, a bottom plate 33b can be attached to extend between the sidewalls of the base member 31a. The notch 33a can receive a lower part of the distal end 23b as the tow bar 23 is coupled to the coupled portion 30. This allows the height of the L-shaped plate members 31b, 31c to be shortened, thereby reducing the size of the recess forming portion 31. The bottom plate 33b can reinforce the base member 31a, and also functions as a stopper to prevent the distal end 23b of the tow bar 23 from falling down.

The L-shaped plate members 31b, 31c are metal plates bent in an L shape, and are fixed on the upper face of the base member 31a to be opposed to each other, with one of the longitudinal side edges of each L-shaped plate member extending along the front edge of the base member 31a and the edge of the notch 33a. In other words, the L-shaped plate members 31b, 31c are each fixed on the base member 31a, such that a longitudinal portion of one of the side edges of the L-shaped plate member extends along the edge of the notch 33a and a lateral portion of the one of the side edges of the L-shaped plate member extend along the front edge of the base member 31a.

A stopper 33c, which is a pin, extends between generally central, opposed parts of the L-shaped plate members 31b, 31c. The stopper 33c can be provided, e.g., fixed to the L-shaped plate members 31b, 31c, such that both ends of the stopper 33c are inserted in attachment holes, formed respectively in the L-shaped plate members 31b, 31c. The ends of the stopper 33c can be welded to the attachment holes. The axial length of the stopper 33c can be smaller than the distance between the outside edges of the attachment holes so that no resulting weld bead projects outside from the surfaces of the L-shaped plate members 31b, 31c.

In one embodiment, in opposed front parts of the L-shaped plate members 31b, 31c, coaxial shaft insertion holes 34a, 34b are formed respectively, while in opposed rear parts of the L-shaped plate members 31b, 31c, coaxial shaft insertion holes 35a, 35b are formed respectively. In the outer face of the L-shaped plate member 31b and above the shaft insertion hole 34a, a conical shallow recess 35c is formed. The rear ends of the L-shaped plate members 31b, 31c can extend to a generally central portion of the base member 31a. The upper face of the base member 31a and the L-shaped plate members 31b, 31c define a space as a recess according to the present invention.

A retention member 36 can be attached to the recess forming portion 31 via the shaft insertion holes 35a, 35b. The retention member 36 includes a base shaft 36a, a grip portion 36b, and a coupling shaft 36c. The base shaft 36a is inserted through the shaft insertion holes 35a, 35b, and attached such that the base shaft 36a is displaceable in the axial and rotational directions relative to the L-shaped plate members 31b, 31c. The grip portion 36b includes a sidewall portion 37a, an upper portion 37b, and a grip piece 37c that is opposed to a rear portion of the sidewall portion 37a. The upper portion 37b has a front portion of a small lateral width and a rear portion of a larger lateral width and is in an L shape as viewed in plan view.

In one embodiment, one end of the base shaft 36a is fixed to the sidewall portion 37a, on the rear-end side thereof. The retention member 36 can be attached to the recess forming portion 31, with the sidewall portion 37a extending along the L-shaped plate member 31b. The distal end of the coupling shaft 36c can be formed in a conical shape, and the proximal end of the coupling shaft 36c can be fixed to the front end of the sidewall portion 37a. The coupling shaft 36c can be inserted through the shaft insertion holes 34a, 34b, and the coupling hole 27b of the tow bar 23. The distal end of the coupling shaft 36c can engage with the recess 35c of the plate member 31b. The coupling shaft 36c and the coupling hole 27b define a coupling mechanism according to one embodiment.

A washer 38b can be attached to the base shaft 36a, on the other-end side thereof, with a retention pin 38a preventing the washer 38b from coming off. A spring member 39, which can be a coil spring, is attached to the outer peripheral face of the base shaft 36a and between the L-shaped plate member 31c and the washer 38b. The spring member 39 is attached in a compressed state so that the spring member 39 urges the washer 38b away from the L-shaped plate member 31c. The urging force of the spring member 39 is thus transmitted to the grip portion 36b via the retention pin 38a and the base shaft 36a, so that the grip portion 36b presses against the L-shaped plate member 31b.

The spring member 39 can be axially compressed further. As the grip portion 36b is pulled against elastic force of the spring member 39, the spring member 39 is compressed further. This allows the distal end of the coupling shaft 36c to be retracted from the shaft insertion hole 34a. It is thus possible to couple the tow bar 23 to the coupled portion 30, in a way such that the grip portion 36b is pulled to draw the coupling shaft 36c out of the shaft insertion hole 34a, the coupling hole 27b of the tow bar 23 is aligned coaxially with the shaft insertion holes 34a, 34b, and then the grip portion 36b is released.

Figure 11:
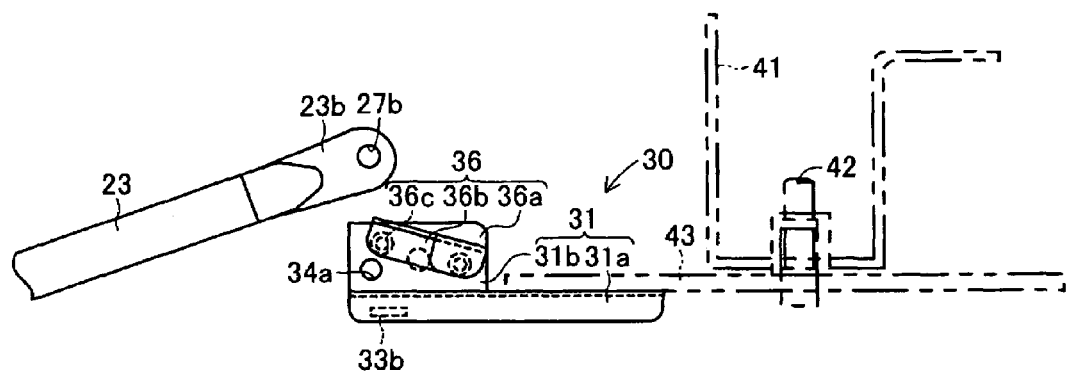
FIG. 11 is a side view, illustrating one state in which a tow bar is gripped and raised above a coupled portion.
Figure 12:
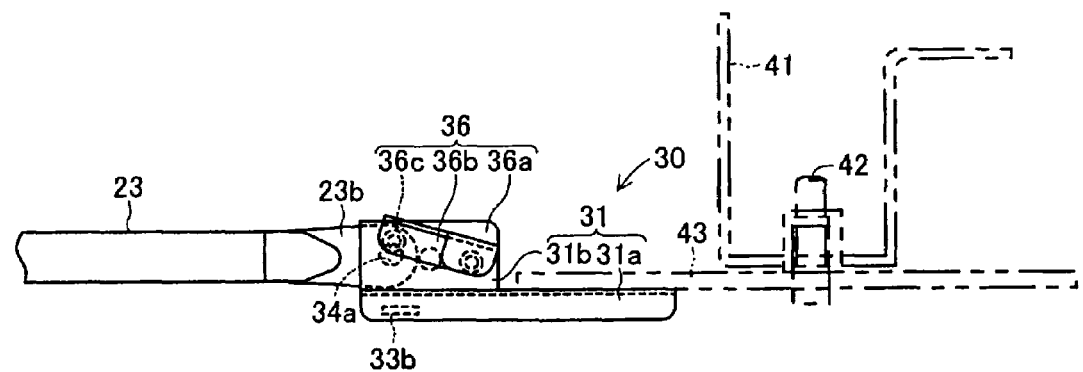
FIG. 12 is a side view, illustrating one state in which a tow bar is received in a recess of a coupled portion.
Figure 13:
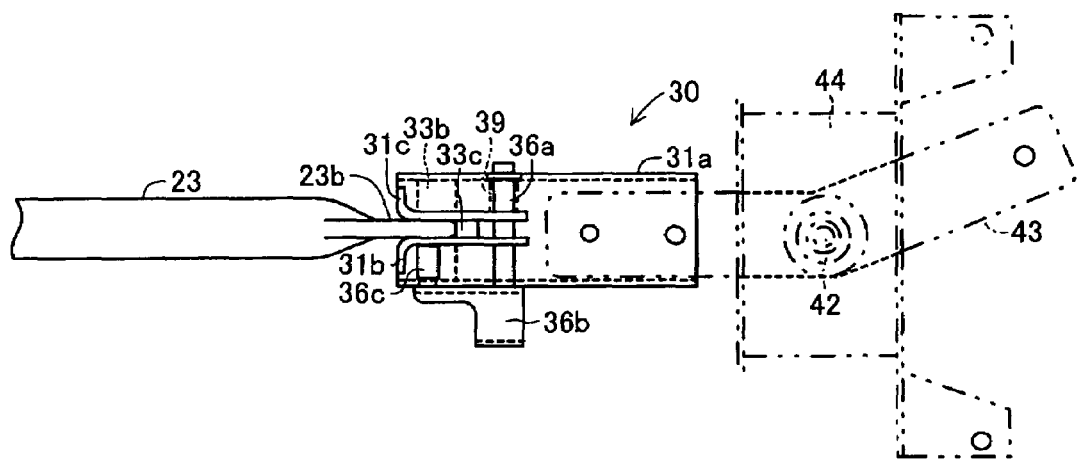
FIG. 13 is a plan view further illustrating the state illustrated in FIG. 12.

In one method of use, two golf carts 10 constructed as above are coupled to each other and run on a ground surface R. In this case, the two golf carts 10 are first placed one in front of the other, and the tow bar 23 of the front golf cart 10 is disengaged from the grip member 24 and directed backward. Then, the grip portion 36b of the coupled portion 30 of the rear golf cart 10 is pulled to draw the coupling shaft 36c out of the shaft insertion hole 34a, and the distal end of the coupling shaft 36c is brought into engagement with the recess 35c. Then, the tow bar 23 is gripped and raised above the coupled portion 30 as shown in FIG. 11. Then, the distal end 23b of the tow bar 23 is lowered from above and received in the recess of the recess forming portion 31 as shown in FIGS. 12 and 13.

Figure 14:
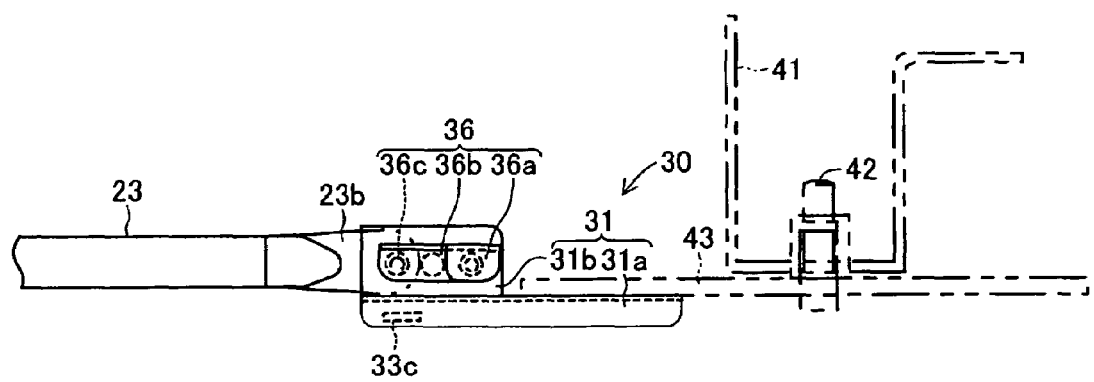
FIG. 14 is a side view illustrating one state in which a tow bar is coupled to a coupled portion.
Figure 15:
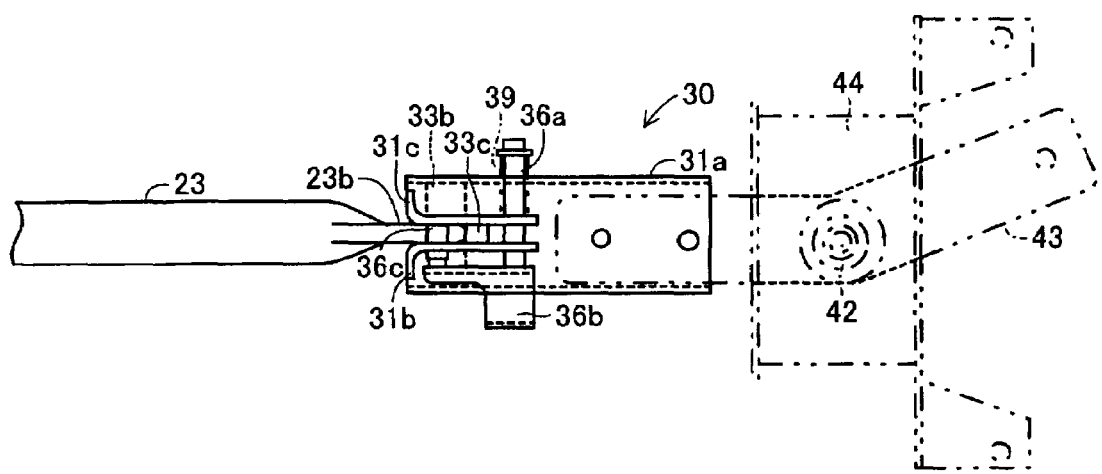
FIG. 15 is a plan view further illustrating the state illustrated in FIG. 14.

In this case, the distal end 23b of the tow bar 23 is prevented from being disposed too far backward by means of the stopper 33c, and also prevented from falling down by means of the bottom plate 33b. This makes it possible to easily align the coupling hole 27b of the tow bar 23 coaxially with the shaft insertion holes 34a, 34b of the recess forming portion 31. Then, the grip portion 36b is pulled to disengage the distal end of the coupling shaft 36c from the recess 35c, and then released with the distal end of the coupling shaft 36c aligned coaxially with the shaft insertion hole 34a. Due to urging force of the spring member 39, the coupling shaft 36c is then inserted through the shaft insertion holes 34a, 34b and the coupling hole 27b, so that the tow bar 23 is coupled to the coupled portion 30 as shown in FIGS. 14 and 15, and such state is maintained.

Figure 16:
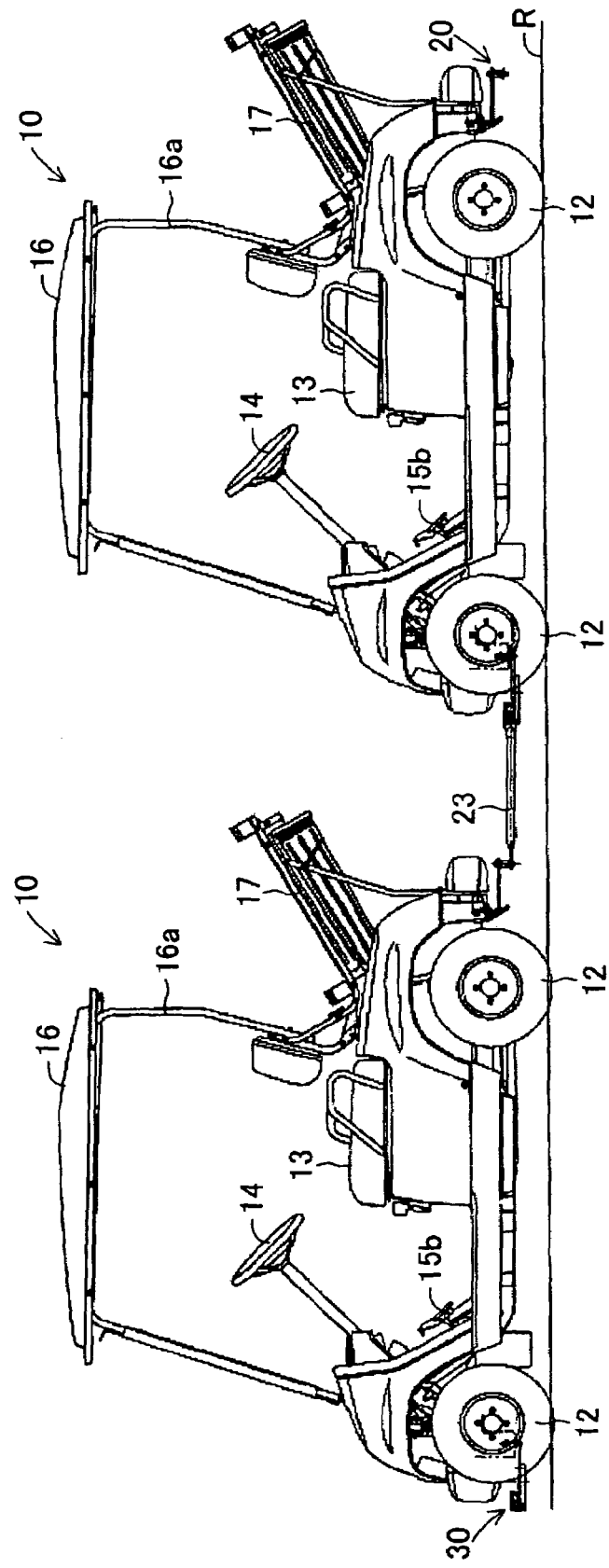
FIG. 16 is a side view, illustrating one state in which the two golf carts are coupled to each other.
Figure 17:
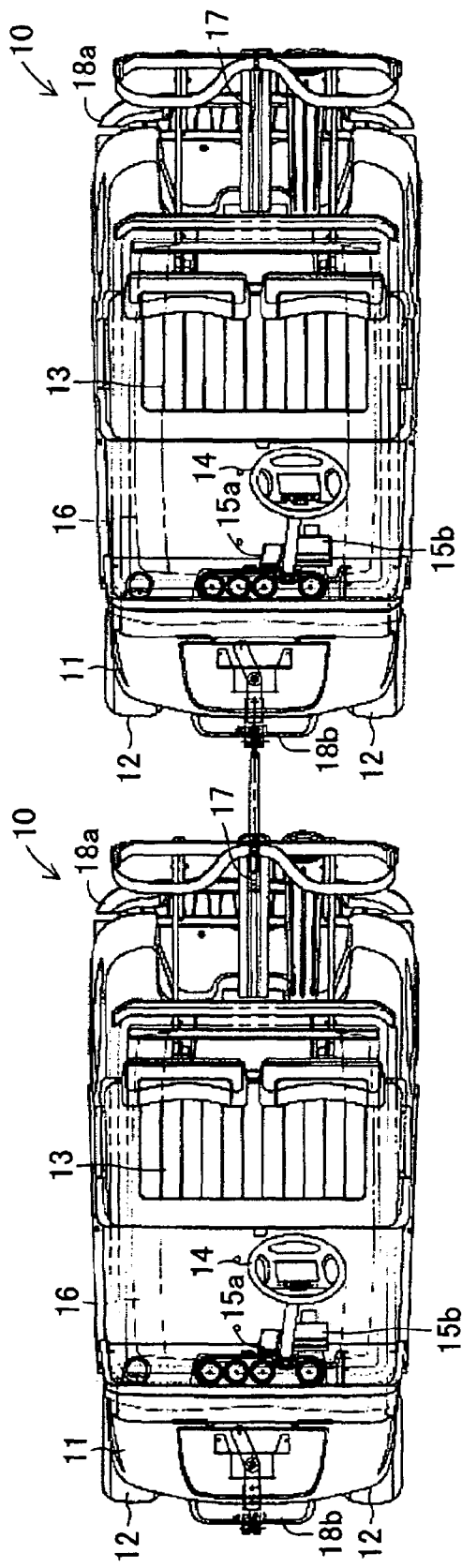
FIG. 17 is a plan view further illustrating the state illustrated in FIG. 16.
Figure 18:
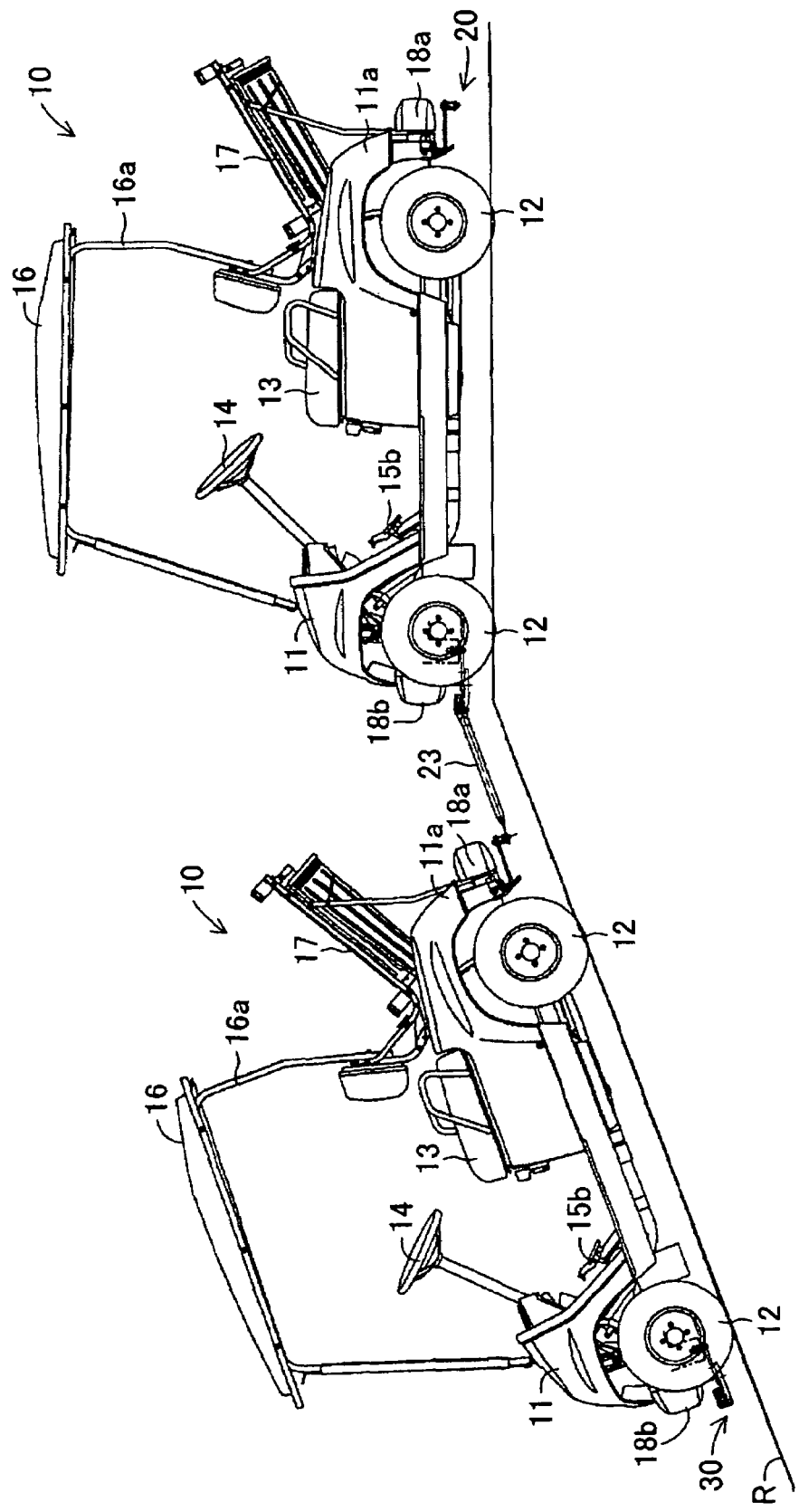
FIG. 18 is a side view, illustrating a state in which the two golf carts coupled to each other run on a slope and a horizontal surface.

The coupling of the two golf carts 10 is thus completed, and the two golf carts 10 are coupled to each other as shown in FIGS. 16 and 17. In this state, as the front golf cart 10 driven forward, the rear golf cart 10 follows the front golf cart 10. As shown in FIG. 18, when the ground surface R has a slope and a horizontal surface, and the front golf cart 10 is positioned on the slope and the rear golf cart 10 is positioned on the horizontal surface, the longitudinal angle of the golf carts 10 changes relative to each other. However, since the tow bar 23 pivots relative to the coupled portion 30, the tow bar 23 vertical bending forces to which the tow bar 23 are subject are reduced if not minimized or completely prevented.

More specifically, the tow bar 23 is pivotable upward and downward about the coupling shaft 36c. Further, the recess forming portion 31 of the coupled portion 30 has the notch 33a, and the end of the distal end 23b of the tow bar 23 is in a circular shape. Thus, the tow bar 23 can pivot without interfering with the coupled portion 30. Further, the proximal end 23a of the tow bar 23 is swingable about the collar 22a and can translate upward and downward, while intermittently compressing the coil spring 26. Thus, forces on the tow bar 23 can be reduced, preventing excessive force from acting thereon. Even in the case in which the ground surface R has a step of a large height, the tow bar 23 is able to pivot about the coupled portion 30 and the distal end 23a of the tow bar 23 swings and translates upward and downward such that force on the tow bar 23 is reduced and excessive force does not act on the tow bar 23. The two golf carts 10 coupled to each other, therefore, run properly over slopes and over two ground surfaces that differ significantly in height or elevation.

Figure 19:
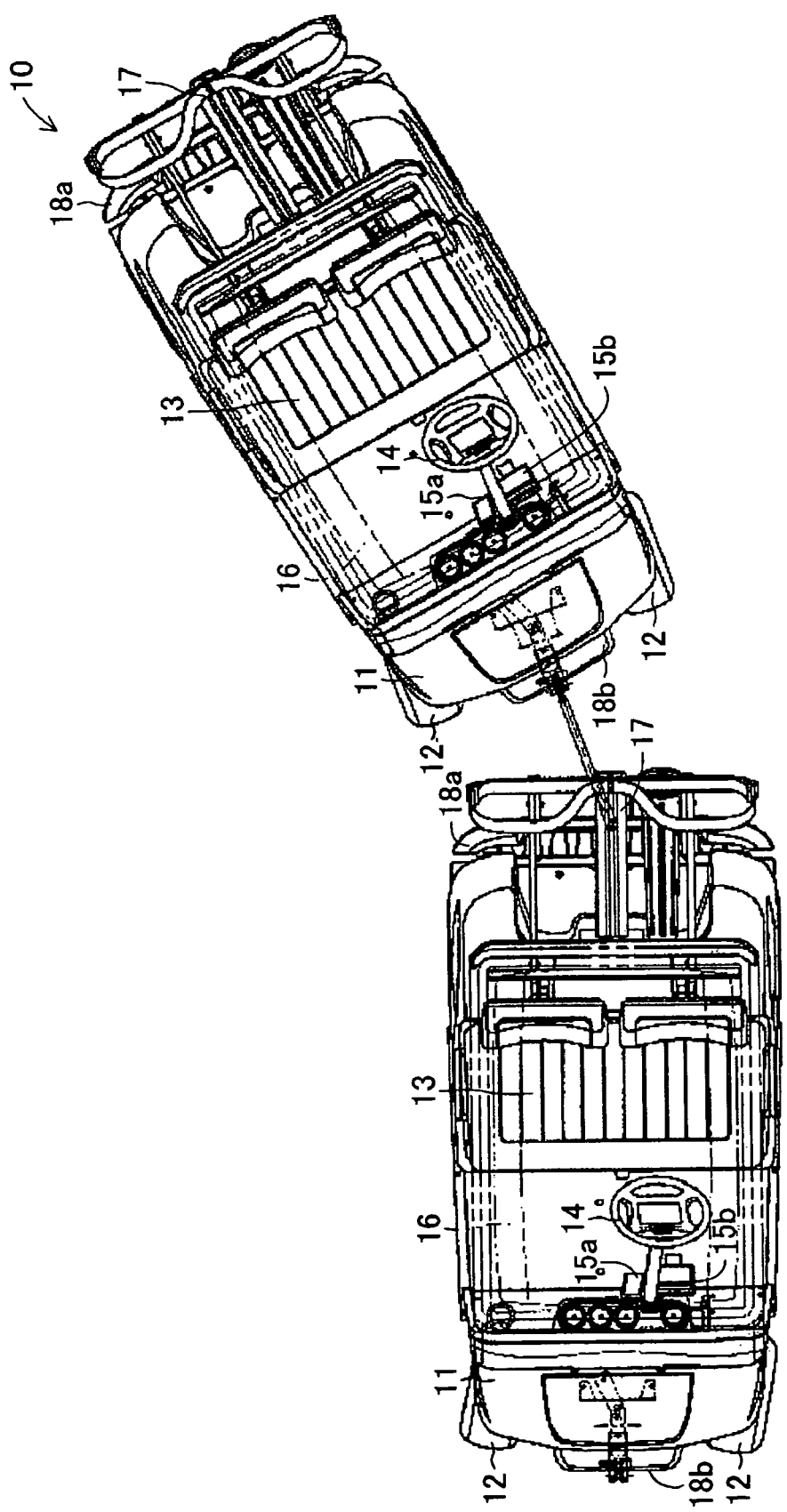
FIG. 19 is a plan view, illustrating a state in which the two golf carts coupled to each other turn to the right.

The tow bar 23 pivots about an axis of the collar 22a when the front golf cart 10 is turned to the right, as shown in FIG. 19. Also, the lever 43, fixed to the coupled portion 30 of the rear golf cart 10, pivots horizontally about the pivot support shaft 42. Thus, no the force acting on the tow bar 23 is not excessive. In this case, the front portion of the lever 43 can be displaced to the right of the vehicle body 11, which causes the tie rod 44 and the knuckle arm 45 to turn the front wheels 12 to the right.

As a result, the rear golf cart 10 turns to the right following the front golf cart 10. Likewise, when the front golf cart 10 is turned to the left, the rear golf cart 10 turns to the left following the front golf cart 10. Further, it is possible to couple two or more golf carts 10, and in such case the golf carts 10 run in the same manner as above. When the towing device is not used, the tow bar 23 is pivoted to the space below the vehicle body 11 and fixed to the grip member 24.

In such manner, in the towing device for a vehicle according to this embodiment, the tow bar 23 can be accommodated in the space below a rear part of the vehicle body 11 when the golf cart 10 is not coupled to another golf cart. Thus, the tow bar 23 is not a hindrance during other use. Also, the tow bar 23 is generally not visible from outside, so the appearance of the golf cart 10 is not adversely affected. Further, since the coupled portion 30 is coupled to the steering link 40, the rear golf cart 10 can be steered in response to pivotal movement of the tow bar 23. Thus, the rear golf cart 10 runs in the direction that the front golf cart 10 runs. This allows multiple golf carts 10 to be driven properly, e.g., by a single operator.

The tow bar 23 is attached such that the tow bar 23 can swing or translate upward and downward relative to the support shaft portion 22 and pivot upward and downward relative to the coupled portion 30. Thus, force is maintained low and excessive force does not act on the tow bar 23, even when the ground surface R has a slope or a large elevation step. Therefore, the support shaft portion 22, the tow bar 23, and the coupled portion 30 will not be damaged in normal use and can last a long time. Further, to couple the tow bar 23 and the coupled portion 30, the tow bar 23 can be lowered from above or can be inserted from forward relative to the coupled portion 30. This arrangement facilitates coupling two golf carts together.

Further, since the stopper 33c is provided between the paired L-shaped plate members 31b, 31c, the L-shaped plate members can be securely fixed, and the distal end 23b of the tow bar 23 can be easily aligned in the right place of the coupled portion 30. Further, as the coupling hole 27b and the coupling shaft 36c are engaged with each other, the tow bar 23 can be coupled to the coupled portion 30, and the grip portion 36b can be urged by means of the spring member 39 such that the coupling hole 27b and the coupling shaft 36c can be engaged. Thus, in the case of coupling the tow bar 23 and the coupled portion 30, it is only required that the grip portion 36b be pulled against urging force of the spring member 39, and then released with the coupling hole 27b and the coupling shaft 36c aligned, e.g., coaxially with each other. This arrangement makes the coupling operation simple.

Further, after the tow bar 23 and the coupled portion 30 are coupled to each other, the coupled state can be maintained by urging force of the spring member 39. Thus, no special work is required to maintain the coupled state. In the foregoing embodiments, the tow bar 23 is a tubular member, and the proximal end 23a and the distal end 23b of the tow bar 23 are pressed together with the respective inner tubes, into the shape of a flat surface. Thus, the engagement hole 27a and the coupling hole 27b used for coupling can be easily formed, and the mechanical strength of both ends of the tow bar 23 is increased.

A central portion of the tow bar 23 can have a tubular shape. Thus, the tow bar 23 can be easily gripped by hand, and thus operability can be improved. The mechanical strength of the central portion of the tow bar 23 also can be increased. The L-shaped plate member 31b has the recess 35c, with which the coupling shaft 36c can engage. Thus, the operator need not pull the grip portion 36b excessively, and can engage in other activities without having to continue to hold the grip portion 36b against the force of the spring member 39. Further, since the end of the distal end 23b of the tow bar 23 is in a circular shape, the distal end 23b does not interfere with other parts as the tow bar 23 pivots.

This application is not limited to the foregoing embodiment and can be practiced with a variety of modifications. For example, in the foregoing embodiment, the tow bar 23 is accommodated in the space below the vehicle body 11. However, there may be provided an accommodating section or housing, below the vehicle body 11, in which the tow bar 23 is accommodated or hosed. Further, in the foregoing embodiment, the distal end 23b of the tow bar 23 has the coupling hole 27b, and the coupled portion 30 having the coupling shaft 36c is provided at a front part of the vehicle body 11. However, in one variation, at the front part of the vehicle body 11, there can be provided a plate-like member having the coupling hole laterally extending therethrough, and the distal end of the tow bar 23 can be provided with a member having a constitution similar to that of the coupled portion 30.

In another variation, the distal end 23b of the tow bar 23 can be provided with the coupling shaft, and a member having the coupling hole to engage with the coupling shaft can be provided on the coupled portion, such that the member can extend and retract relative to the coupling shaft. Further, in the foregoing embodiment, a vehicle is the golf cart 10. However, the towing devices described herein can be used with other vehicles. So, the vehicle according to the present invention is not limited to the golf cart 10. The present invention is applicable to any vehicles for which it would be desirable to be coupled to several other vehicles of the same or similar type in series to be moved, such as go-carts. Further, the other parts of the towing device for a vehicle according to the present invention can be modified as appropriate with respect to their shape and material within the scope of the present invention.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understand that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A towing device capable of coupling a rear part of a front vehicle and a front part of a rear vehicle, the towing device comprising:
   a support shaft configured to be positioned on the rear part of the front vehicle such that an axis of the support shaft extends vertically;
   a coupled portion configured to be positioned on the front part of the rear vehicle; and
   a tow bar having a distal end and a proximal end, the distal end being capable of being removably coupled to the coupled portion, the proximal end being coupled with the support shaft to be pivotable about the axis of the support shaft;
   a grip member configured to be coupled with a vehicle to a lateral side of and forward of the support shaft, the grip member having an upper portion disposed at an elevation at least partially below that of the tow bar;
   wherein the tow bar can be pivoted from an extended position in which the distal end can be coupled to the coupled portion to a storage position in which the tow bar can be accommodated in the space below the rear part of the front vehicle, wherein when in the storage position, the upper portion of the grip member engages the tow bar.

2. The towing device of claim 1, wherein the coupled portion is configured to be coupled to a steering link of the rear vehicle so that the rear vehicle is steered in response to pivotal movement of the tow bar.

3. The towing device of claim 1, wherein the proximal end of the tow bar is attached to the support shaft such that the distal end of the tow bar can swing upward and downward.

4. The towing device of claim 1, wherein the distal end of the tow bar is lowered from above relative to the coupled portion into engagement with the coupled portion when the tow bar and the coupled portion are coupled together.

5. The towing of claim 1, wherein the distal end of the tow bar comprises a recess forming portion having a recess that is open downward and backward when the tow bar is coupled to the coupled portion and the coupled portion comprises an insertion portion configured to be inserted in the recess of the recess forming portion on the tow bar.

6. The towing of claim 1, wherein the coupled portion of the rear vehicle comprises a recess forming portion having a recess that is open upward and forward and into which the distal end of the tow bar can be inserted.

7. The towing device of claims 1, wherein the distal end of the tow bar and the coupled portion are coupled to each other via a coupling mechanism, the coupling mechanism including a coupling shaft and a coupled hole provided in the coupled portion to engage with the coupling shaft for pivotal movement of the tow bar.

8. The towing device of claim 1, wherein the tow bar is a tubular member, and at least one of the proximal end and the distal end of the tow bar comprise a flat surface.

9. The towing device of claim 1, wherein two or more of the vehicles of the same type can be coupled to each other via the towing device.

10. The towing device of claims 1, wherein the distal end of the tow bar and the coupled portion are coupled to each other via a coupling mechanism, the coupling mechanism including a coupling hole provided at the distal end of the tow bar and a coupled shaft provided on the coupled portion to engage with the coupling hole for pivotal movement of the tow bar.

11. The towing device of claim 10, wherein the coupling shaft and the coupled hole shaft are formed to engage coaxially with each other and are urged by means of a spring member into engagement.

12. The towing device of claim 10, wherein at least one of the proximal end and the distal end of the tow bar has a reinforcement member positioned in the inner space thereof.

13. A towing device capable of coupling a rear part of a front vehicle and a front part of a rear vehicle, the towing device comprising:
   a support shaft configured to be positioned on the rear part of the front vehicle such that an axis of the support shaft extends vertically;
   a coupled portion configured to be positioned on the front part of the rear vehicle; and
   a tow bar having a distal end and a proximal end, the distal end being capable of being removably coupled to the coupled portion, the proximal end being coupled with the support shaft to be pivotable about the axis of the support shaft;
   wherein the tow bar can be pivoted from an extended position in which the distal end can be coupled to the coupled portion to a storage position in which the tow bar can be accommodated in the space below the rear part of the front vehicle;
   wherein the coupled portion of the rear vehicle comprises a recess forming portion having a recess that is open upward and forward and into which the distal end of the tow bar can be inserted; and
   wherein the recess forming portion comprises:
   a base member having a flat surface; and a pair of L-shaped members including a longitudinal portion and a lateral portion, the L-shaped members being spaced apart, the lateral portions extending laterally of the front ends of the longitudinal portions, the recess being formed in a space enclosed by the base member and the longitudinal portions of the L-shaped members.

14. The towing device of claim 13, wherein a stopper is provided between the longitudinal portions of the L-shaped members to limit the position of the distal end of the tow bar relative to the coupled portion, to reinforce the paired L-shaped plate members, or to limit the position of the distal end of the tow bar relative to the coupled portion and to reinforce the paired L-shaped plate members.

15. A system for towing a rear vehicle behind a front vehicle, comprising:
a front vehicle having a rear part and a vehicle body;
a towing device coupled with the front vehicle and configured to be removably coupled with a front part of a rear vehicle, the towing device comprising:
a support shaft positioned on the rear part of the front vehicle, the support shaft being rotatable about a vertically extending axis;
a tow bar having a proximal end and a distal end configured to be removably coupled with the rear vehicle, the proximal end being coupled with the support shaft to be pivotable about the axis of the support shaft; and
a grip member positioned on the front vehicle to a lateral side of and forward of the support shaft, the grip member having an upper portion disposed at an elevation at least partially below that of the tow bar when the tow bar is in use;
wherein the towing device has a storage configuration in which at least the distal end of the tow bar is accommodated at a location laterally spaced from the support shaft, the upper portion of the grip member engaging an upper surface of the tow bar in the storage configuration.

16. The system of claim 15, wherein the support shaft is located at a lateral center of the front vehicle.

17. The system of claim 15, wherein the front vehicle further comprises a bumper or a rear cowl and the tow bar is accommodated in a space below the bumper or the rear cowl in the storage configuration.

18. The system of claims 15, wherein the proximal end of the tow bar is coupled with the support shaft such that the distal end of the tow bar can swing upward and downward.

19. The system of claim 15, further comprising a coupled portion configured to be coupled with a front part of the rear vehicle.

20. The system of claim 19, wherein the coupled portion is coupled with a steering link of the rear vehicle so that the rear vehicle is steered in response to pivotal movement of the tow bar.

21. The system of claim 19, wherein the coupled portion comprises a recess forming portion having a recess that opens upward and forward, the recess being configured to receive the distal end of the tow bar.

22. The system of claim 19, wherein the distal end of the tow bar comprises a recess forming portion having a recess that is open downward and backward and the coupled portion is provided with an insertion portion to be inserted in the recess of the recess forming portion on the tow bar.

23. The system of claim 15, further comprising a rear vehicle to be towed by the front vehicle, wherein the front vehicle and the rear vehicle are vehicles of the same type.

24. The system of claim 15, wherein the upper portion of the grip member comprises an elastic member configured to be displaced by the tow bar when the tow bar is urged forwardly against the upper portion.

25. The towing device of claim 15, wherein the grip member comprises a lower portion, the upper and lower portions forming a generally circular member having a gap located at a rearward portion thereof, the grip member configured to resiliently expand the size of the gap to permit the tow bar to move forwardly relative to the grip member into a storage configuration.

26. A towing device for a vehicle capable of coupling a rear part of a front vehicle and a front part of a rear vehicle, the towing device comprising:
a support shaft provided in the rear part of the front vehicle near a longitudinally extending vertical center plane thereof with an axis of the support shaft extending vertically;
a coupled portion provided at the front part of the rear vehicle;
a tow bar having a distal end and a proximal end, the distal end being capable of being removably coupled to the coupled portion, the proximal end being attached to the support shaft to be pivotable about the axis of the support shaft, and
a grip member configured to be coupled with the front vehicle to a lateral side of and forward of the support shaft, the grip member having an upper portion configured to engage an upper portion of the tow bar, the upper portion of the grip member being disposed at least partially below the tow bar when the tow bar is in use;
wherein when not in use, the tow bar can be pivoted toward and positioned in the space below the rear part of the front vehicle.

27. The towing device of claim 26, wherein the upper portion of the grip member comprises an elastic member configured to be displaced by the tow bar when the tow bar is urged forwardly against the upper portion.

28. The towing device of claim 26, wherein the grip member comprises a lower portion, the upper and lower portions forming a generally circular member having a gap located at a rearward portion thereof, the grip member configured to resiliently expand the size of the gap to permit the tow bar to move forwardly relative to the grip member into a storage configuration.

* * * * *

UNITED STATES PATENT AND TRADEMARK OFFICE
CERTIFICATE OF CORRECTION

PATENT NO. : 7,510,204 B2
APPLICATION NO. : 11/406780
DATED : March 31, 2009
INVENTOR(S) : Inoue et al.

It is certified that error appears in the above-identified patent and that said Letters Patent is hereby corrected as shown below:

In column 2, line 63, after "vehicle" delete "an".

In column 13, line 31, change "understand" to --understood--.

In column 14, line 4, claim 4, after "towing" insert --device--.

In column 14, line 8, claim 5, after "towing" insert --device--.

In column 14, line 14, claim 6, after "towing" insert --device--.

In column 14, line 18, claim 7, change "claims" to --claim--.

In column 14, line 30 (approximate), claim 10, change "claims" to --claim--.

Signed and Sealed this

Twenty-fourth Day of November, 2009

David J. Kappos
*Director of the United States Patent and Trademark Office*